United States Patent
Koroshetz et al.

(10) Patent No.: US 7,319,708 B2
(45) Date of Patent: Jan. 15, 2008

(54) VARIABLE PULSE REPETITION FREQUENCY PASSIVELY Q-SWITCHED LASER

(75) Inventors: John E. Koroshetz, Orlando, FL (US); Josef R. Unternahrer, Lafayette, CO (US)

(73) Assignee: Lockheed Martin Coherent Technologies, Inc., Louisville, CO (US)

( * ) Notice: Subject to any disclaimer, the term of this patent is extended or adjusted under 35 U.S.C. 154(b) by 316 days.

(21) Appl. No.: 11/062,992

(22) Filed: Feb. 22, 2005

(65) Prior Publication Data

US 2006/0187975 A1    Aug. 24, 2006

(51) Int. Cl.
*H01S 3/11* (2006.01)
*H01S 3/113* (2006.01)

(52) U.S. Cl. .......................................... 372/10; 372/11
(58) Field of Classification Search ................. 372/10, 372/11, 14, 17
See application file for complete search history.

(56) References Cited

U.S. PATENT DOCUMENTS

| | | | | |
|---|---|---|---|---|
| 5,303,256 A | * | 4/1994 | Sumida | 372/106 |
| 5,654,974 A | * | 8/1997 | Stultz | 372/11 |
| 6,466,593 B1 | | 10/2002 | Fukumoto | |
| 6,723,977 B1 | * | 4/2004 | Fukumoto | 250/216 |
| 6,842,466 B1 | * | 1/2005 | Tam et al. | 372/25 |

* cited by examiner

*Primary Examiner*—Armando Rodriguez
(74) *Attorney, Agent, or Firm*—McDermott Will & Emery LLP

(57) ABSTRACT

A passive Q-switch element is disclosed that permits operating a laser with a variable pulse repetition frequency (PRF). The Q-switch comprises two wedges of material, one made from saturable absorber material, the other from transparent material, with the two wedges mounted together to form a constant optical thickness block. By translating the block transversely to a laser beam the amount of saturable absorber material seen by the laser beam is altered and as a result the PRF of the laser is varied.

13 Claims, 4 Drawing Sheets

VARIABLE PULSE REPETITION FREQUENCY PASSIVELY Q-SWITCHED LASER

FIELD OF THE INVENTION

The present invention relates to apparatus and methods for varying the pulse repetition frequency in passively Q-switched lasers.

DISCUSSION OF THE BACKGROUND ART

Q-switching is a method used in lasers to produce short intense pulses of light. In a laser the active gain medium is enclosed in a resonator, such as comprising a pair of mirrors, to permit the laser beam to transit repeatedly through the gain medium and build up in strength. The Q of the cavity is a measure of the cavity loss. A high Q means that the loss is low and light may reflect many times between the mirrors, while a portion also transmits out through one mirror with each round-trip. A low Q means that the loss is high. If the gain medium is pumped while the cavity Q is low, energy is stored in the gain medium without being extracted, since the circulating light intensity is low. Q-switching refers to permitting the energy to build in the gain medium (high population inversion) in such a low-Q state, and then rapidly switching the cavity to a high-Q state. This has the effect of rapidly building up a pulse of light that efficiently extracts the stored energy and outputs the light as a short intense light pulse.

Q-switching is frequently done using active means, in particular using electro-optic or acousto-optic devices to rapidly switch between low and high Q states. This works well but means that actively driven and frequently expensive means must be added to the laser cavity. For short pulse generation active approaches can also be problematic because the temporal width of a laser pulse is proportional to the length of the laser cavity and adding bulky (such as several cm long) elements in the cavity can force the pulses to be longer than desired.

An alternative method is to passively Q-switch the laser using a saturable absorber (SA), such as cobalt spinel. These materials normally absorb light. However, when the intensity incident on them reaches a certain threshold (bleaching point) the material can no longer absorb more light and becomes transparent. Insertion of such a device in a laser cavity therefore permits one to operate the laser at first in a low-Q state when the saturable absorber is absorbing, and then in a high-Q state once the saturable absorber reaches the bleaching point. If the loss of the SA is chosen properly light intensity builds up slowly in the cavity until the intensity bleaches the SA. At that point the cavity Q is switched to a high state and the cavity produces a short pulse. In the case where the gain medium is pumped continuously a cycle is produced wherein the stored energy builds up in the gain medium, the Q-switching action extracts the energy into a pulse, the SA returns to the absorbing state within a characteristic time, the energy starts to build up again and another pulse is produced. As a result these lasers produce a train of pulses whose pulse repetition frequency is dependent on the laser design, and in particular on the characteristics of the saturable absorber. If the SA is made too absorbing (too optically thick) the laser light never builds up to a high enough intensity to bleach and Q-switching never takes place. If the material is made insufficiently absorbing (too optically thin) the low-Q state is not realized and Q-switching also doesn't take place. Between these regimes there is a region where the thickness of the material can be selected as a compromise to produce pulses at a specific pulse repetition frequency (PRF).

A limitation with passive Q-switching is evident from this discussion. For a given laser configuration, once the thickness of material has been chosen, the PRF of the laser is fixed and can only be altered by replacing the Q-switch with a different thickness material. This is inconvenient if one desires to vary the pulse rate. In addition, changes in the pumping of the gain medium (including aging effects) over time may alter the time it takes to build up enough intensity to bleach the Q-switch. This can have the inadvertent effect of the PRF changing with time.

In U.S. Pat. No. 6,466,593 a device is described to circumvent this limitation. The device consists of two wedges of saturable absorbers that are moved relative to one another in such a manner that the total optical thickness of the SA can be changed. In principle this device works, but it has several practical limitations. First, the device requires two wedges to move in opposite directions along the same axis. This is very inconvenient to implement. Second, because both wedges must move, there has to be a space between the wedges to prevent wear. Third, since the thickness of the material changes as the wedges are moved, the length of the laser cavity also changes. For short laser cavities this can become very problematic. Not only does this alter the laser PRF, but it can also lead to changes in the diameter of the resulting laser beam, which is frequently highly undesirable.

A need, therefore, remains in the art for methods and apparatus for varying pulse repetition frequency in passively Q-switched lasers which overcome the disadvantages of previous inventions.

SUMMARY OF THE INVENTION

It is an object of the present invention to provide methods and apparatus for varying pulse repetition frequency in passively Q-switched lasers which overcome the disadvantages of previous inventions.

A specific benefit of the invention is that it provides a compact variable Q-switching element that only needs to be moved in one direction.

An additional benefit of the invention is that the variable Q-switching element may be made as a single monolithic unit.

An additional benefit of the invention is that its operation does not alter the length of the laser cavity.

A passive Q-switch element according to the present invention for varying the laser Pulse Repetition Frequency of a laser comprises a first wedge made of saturable absorber material and a second wedge made of a non-saturable absorber material. The first wedge and the second wedge are sized and assembled to form a discrete, substantially constant optical thickness block.

The first wedge and the second wedge may be bonded together. Or, they may be separated by a substantially constant space.

The Q-switch element may also a second piece comprising a first wedge made of saturable absorber material and a second wedge made of a non-saturable absorber material. The first wedge and the second wedge are also sized and assembled to form a discrete, substantially constant optical thickness, block. In this embodiment, the first block and the second block are juxtaposed and oriented such that the total thickness of saturable absorber material along a predetermined laser cavity axis is constant.

A variable PRF Q-switched laser according to the present invention comprises a laser cavity with a gain medium and having a laser cavity axis, a passive Q-switch element situated within the laser cavity, for varying the laser Pulse Repetition Frequency of the laser, and means for translating the Q-switch element in a direction not parallel to the laser axis.

The Q-switch element of the laser is a piece comprising a first wedge made of saturable absorber material and a second wedge made of a non-saturable absorber material. The first wedge and the second wedge are sized and assembled to form a discrete, substantially constant optical thickness, block.

The Q-switch element may be situated at an angle to said laser cavity. In one embodiment, this angle equals the Brewster angle of the Q-switch materials. The Q-switch element may further include a second piece similar to that described above. In this case, the first block and the second block are juxtaposed and oriented such that the total thickness of saturable absorber material along the laser axis is constant.

DETAILED DESCRIPTION OF THE INVENTION

Figure 1A:
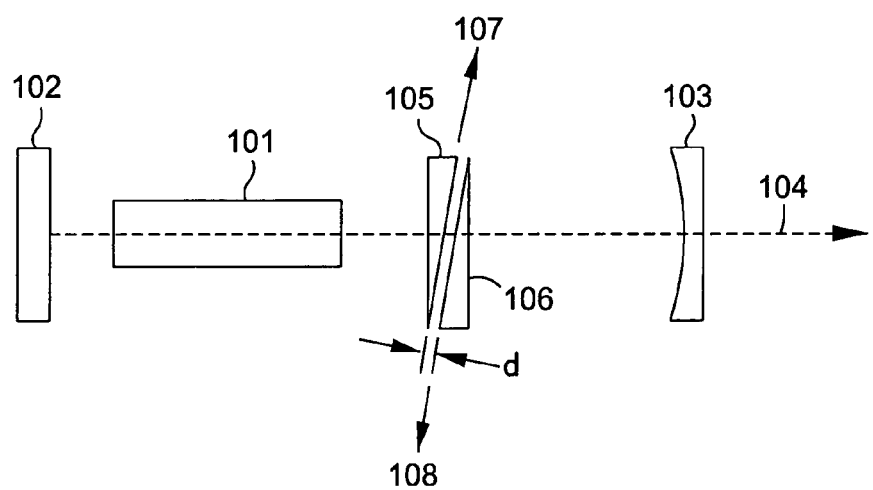
FIGS. 1a and 1b are block diagrams which show a laser cavity with a Q-switch of conventional design (PRIOR ART).
Figure 1B:
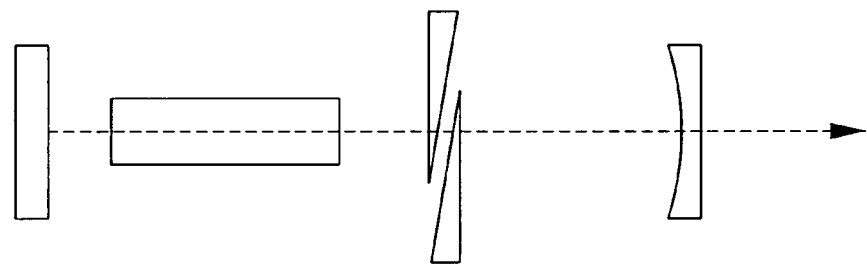

FIG. 1 (Prior Art) shows a laser cavity containing the passive Q-switch design described by Fukumoto in U.S. Pat. No. 6,466,593. The laser contains a gain medium 101 and the cavity is formed by two end mirrors 102 and 103. At least one of the end mirrors (103 as illustrated) is partially transmitting to produce a light beam traveling along laser cavity axis 104. The passive Q-switch comprises two wedges 105 and 106 made of suitable saturable absorber material. The two wedges are further separated by a space of constant distance d as illustrated. In order to change the PRF of the laser, the two wedges 105, 106 are moved simultaneously in opposite directions, with wedge 105 moving along axis 107 and wedge 106 moving along axis 108. In accordance with the invention this preserves spacing distance d. FIG. 1b illustrates a typical position of wedges 105 and 106 after they have been moved.

Figure 2A:
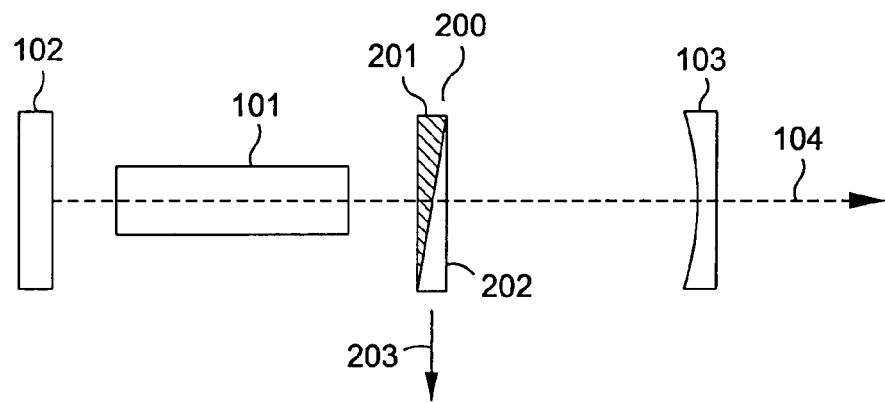
FIGS. 2a, 2b, and 2c are block diagrams which show various embodiments of a variable PRF passively Q-switched laser cavity according to the present invention.
Figure 2B:
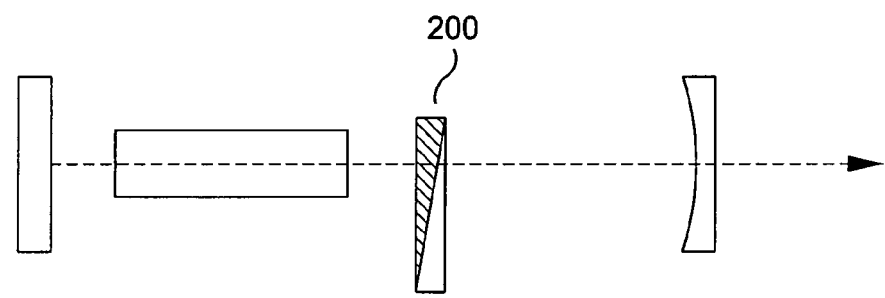
Figure 2C:
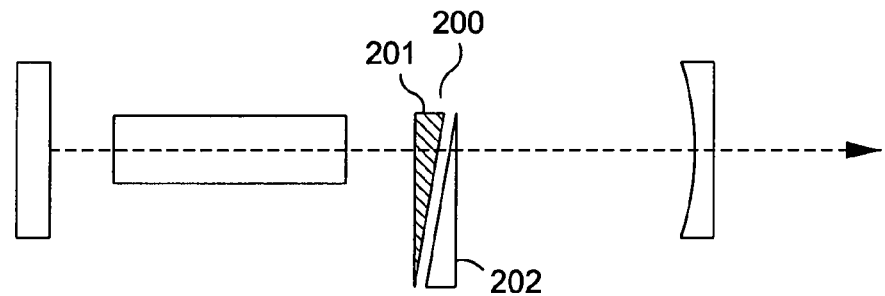

FIGS. 2a and 2b are block diagrams which show a first embodiment of a variable PRF passively Q-switched laser cavity according to the present invention. The main elements of the laser cavity are the same as in FIG. 1 and are denoted by the same numerals in this and following figures. The variable Q-switching element 200 is, however, of a different design. As shown it comprises two wedges, 201 and 202, that are held together as a unit and may be bonded together, as shown in FIGS. 2a and 2b. Alternatively, wedges 201 and 202 may be mounted with a gap between their mating surfaces, as shown in FIG. 2c. Any surfaces that form an interface to a different refractive index, such as spinel to air, will preferably be anti-reflection coated to minimize reflection losses and etalon effects. Wedge 201, shown hatched, is made of the saturable absorber material, while wedge 202 is made from an un-doped material. The material chosen for the saturable absorber wedge 201 may be, for example, cobalt-doped spinel. The material chosen for the second wedge is not critical, but it should in general meet several criteria and will henceforth be referred to as non-saturable absorber material. It should be of good optical quality and transparent at the laser wavelength, it should have a sufficiently high optical damage threshold to be useful, and it should have substantially the same index of refraction as the saturable absorber 201 in order that a light beam is not refracted in traveling through the combined device.

To operate the variable Q-switch element 200 to vary the PRF, element 200 is translated along an axis 203 that is shown as substantially perpendicular to the laser cavity axis 104. This will vary the thickness of saturable absorber material seen by the light beam and will as a result change the PRF. A typical position of the variable Q-switch element 200 after such a move is illustrated in FIG. 2b. Movement of variable Q-switch element 200 may be accomplished by, for example, mounting it to a mechanical translation stage (not shown). Alternative devices, including piezoelectric elements or electromagnetic voice-coils, may also be used to affect movement. It will also be obvious to those skilled in the art that the primary objective of the invention is to change the thickness of saturable absorber material through which the laser beam passes, rather than any specific motion. Rotation of the device, as well as translations along axes not perpendicular to the laser cavity axis can accomplish the same result. In many cases linear translation is preferably as it does not translate the axis of the laser cavity.

Figure 3:
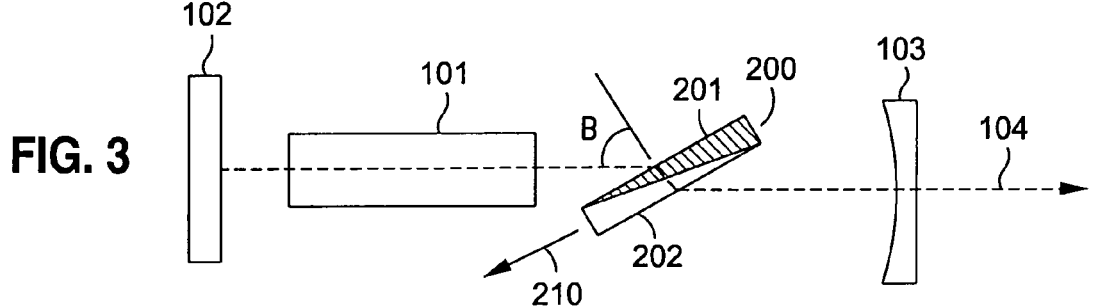
FIG. 3 is a block diagram showing a second embodiment a variable PRF passively Q-switched laser cavity according to the present invention.

An alternative embodiment of the invention is shown in FIG. 3. In the embodiment of FIG. 3, the variable Q-switch element 200 is placed in the laser cavity at an angle θB to the laser cavity axis. The angle $\theta_B$ can be arbitrarily selected but it is preferential that it equals the Brewster angle of the Q-switch material. The Brewster angle is given by the expression $\theta_B = \tan^{-1}(n)$, where n is the refractive index of the material. In the case of cobalt doped spinel n~1.71 and the corresponding Brewster angle is approximately 60 degrees. When this is done there is essentially zero reflection loss for p-polarized light in the cavity. Since s-polarized light suffers a reflection loss, insertion at this angle has the effect of polarizing the laser beam, which is frequently a desired characteristic. When the device is inserted at an angle, motion of the Q-switch can still be done perpendicular to the laser cavity axis as in FIG. 2, or it can be made at an arbitrary angle to the laser cavity axis, for example along an axis 210 as illustrated in FIG. 3.

Figure 4A:
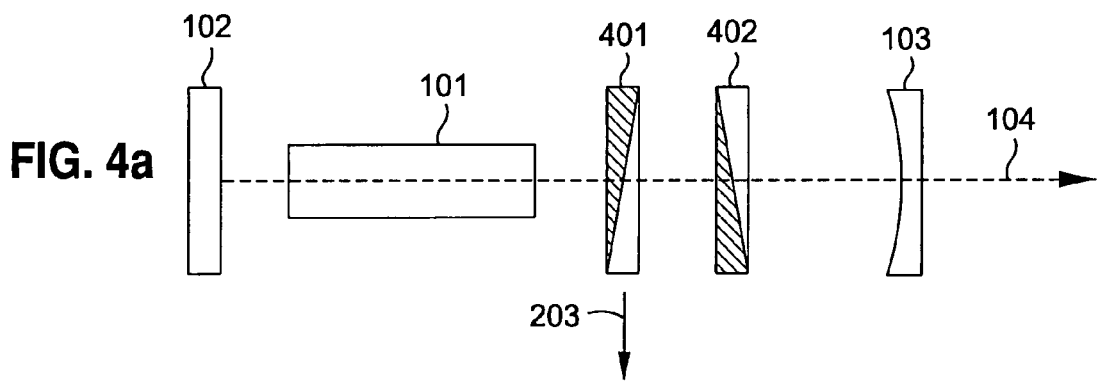
FIGS. 4a and 4b are block diagrams which show a third embodiment of a variable PRF passively Q-switched laser cavity according to the present invention.
Figure 4B:
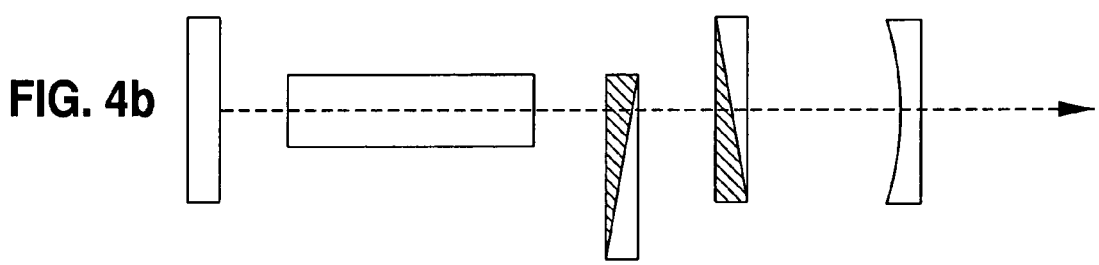

A third embodiment of the invention is shown in FIGS. 4a and 4b. In the embodiment of FIG. 4, variable Q-switch element 400 comprises two separate blocks 401, 402, each of which itself comprises two wedges, 403, 404 formed as a unit. Blocks 401 and 402 are similar to units 200 in FIGS. 2a, 2b, and 3.

Wedge 403, shown hatched, is made of a saturable absorber material, while the other wedge 404 is made from an un-doped material.

It is noted that as illustrated in FIGS. 2a, 2b and 3 the thickness of saturable absorber material varies across the wedge perpendicular to the laser cavity axis. A laser beam having a finite width (mode size) would therefore experience an absorption gradient across the width of the beam. So, for example, in FIG. 2b, the top of beam 104 passes through a thicker part of SA wedge 201 than the bottom of beam 104. If the gradient is weak this is not a concern, but if the gradient is strong unwanted effects may occur. The arrangement shown in FIG. 4a prevents this potential problem from occurring. In FIG. 4a, blocks 400 are combination units comprising a saturable absorber wedge 403 and an un-doped wedge 404. Block 401 is inserted in opposite orientation to unit 402 (e.g. rotated 180° about the laser axis). The insertion of a second unit ensures that the total length of saturable absorber material does not vary transversely to the laser cavity axis. In other words, the top part of laser beam 104 will see the same total thickness of saturable material as the bottom portion.

FIG. 4b shows the embodiment of FIG. 4a after a typical translation, in which block 401 is translated, while block 402 remains stationary. As illustrated in FIG. 4b, there is still no thickness gradient transverse to the laser cavity axis, but the total thickness of saturable absorber has changed as desired. When the range achievable with unit 401 becomes exhausted, it can be extended by translating unit 402 to a suitable new position.

Figure 5:
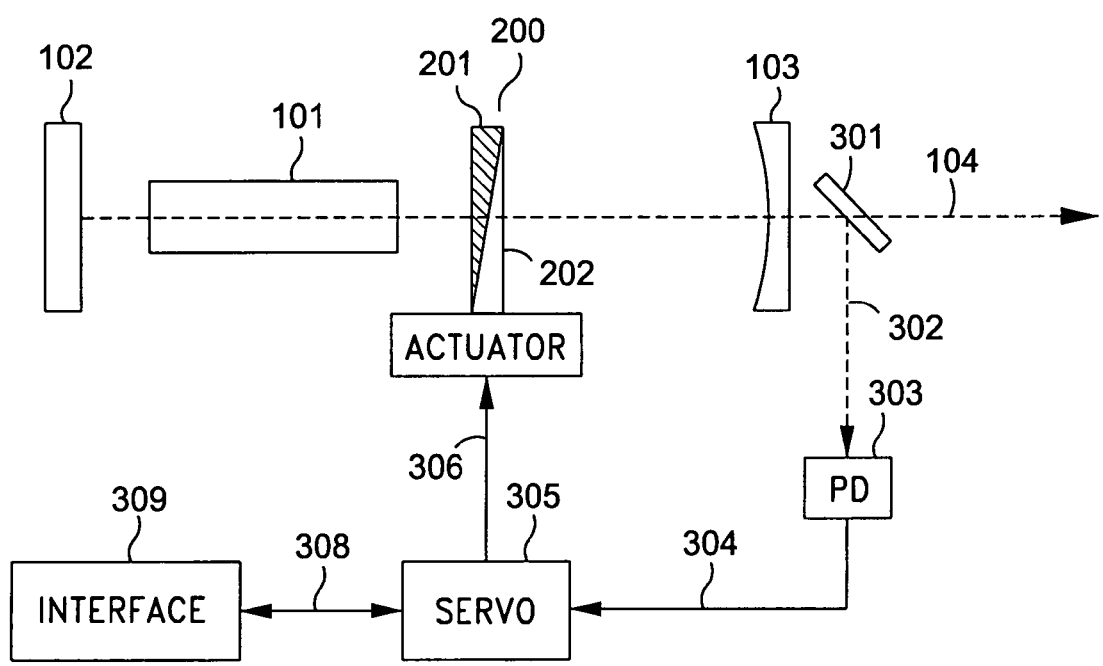
FIG. 5 is a block diagram showing a variable PRF passively Q-switched laser system similar to that of FIGS. 2a and 2b, with its associated control system.

FIG. 5 is a block diagram showing a variable PRF passively Q-switched laser system similar to that of FIGS. 2a and 2b, with its associate control system. The laser cavity embodiment of FIG. 3, or that of FIG. 4, could substitute for the cavity (101, 102, 103, 200) shown in FIG. 5. Reasons for desiring such control include variations in laser pump power or aging of components that may affect the laser PRF. The laser system of FIG. 5 includes a mirror 301 that reflects a small sample (such as less than 1%) of the laser beam 104 along direction 302 towards a photo-detector 303. The photo-detector 303 outputs an electrical signal when laser pulses occur and sends a signal 304 to servo control unit 305. The servo unit compares the frequency of pulses received with a setting received from an interface device 309 via control line 308. Control signal 306 controls a motion actuator 307, which is in turn connected to Q-switch element 200. Motion actuator 307 adjusts the position of the Q-switch element 200 such that the laser PRF matches the setting indicated by interface unit 309. Bi-directional communication on control line 308 with interface unit 309 is useful in some circumstances. It will be obvious to those skilled in the art that detecting a sample of the laser pulse on a photo-detector may be done in many alternative ways that may not require placing a mirror in the laser beam. It may, for example, be sufficient to detect light scattered from defects in optics. Light leaking out of an end mirror, such as mirror 102 in FIG. 2, may also be used.

While the present invention has been shown and described in the context of specific examples and embodiments thereof, it will be understood by those skilled in the art that numerous changes in the form and details may be made without departing from the scope and spirit of the invention as encompassed in the appended claims.

What is claimed is:

1. A passive Q-switch element for varying the laser Pulse Repetition Frequency of a laser comprising:
    a first wedge made of saturable absorber material; and
    a second wedge made of a non-saturable absorber material;
    wherein the first wedge and the second wedge are sized and assembled to form a discrete, substantially constant optical thickness block.

2. The Q-switch element of claim 1 where the first wedge and the second wedge are bonded together.

3. The Q-switch element of claim 1 where the first wedge and the second wedge are separated by a substantially constant space.

4. The Q-switch element of claim 1 further comprising:
    another discrete block comprising a first wedge made of saturable absorber material and a second wedge made of a non-saturable absorber material, and wherein the first wedge and the second wedge are sized and assembled to form a substantially constant optical thickness block;
    wherein the block and the another block are juxtaposed and oriented such that the total thickness of saturable absorber material along a predetermined laser cavity axis is constant.

5. A variable Pulse Repetition Frequency PRF Q-switched laser comprising:
    a laser cavity with a gain medium and having a laser cavity axis;
    a passive Q-switch element situated within the laser cavity, for varying a Pulse Repetition Frequency of the laser; and
    means for translating the Q-switch element in a direction not parallel to the laser axis;
    wherein the Q-switch element is a piece comprising a first wedge made of saturable absorber material and a second wedge made of a non-saturable absorber material, and wherein the first wedge and the second wedge are sized and assembled to form a discrete, substantially constant optical thickness block.

6. The variable Q-switched laser of claim 5 wherein the Q-switch element is situated at an angle to said laser cavity.

7. The variable Q-switch laser of claim 6 wherein the angle equals the Brewster angle of the Q-switch materials.

8. The variable Q-switched laser of claim 5 wherein:
    the Q-switch element further comprises another discrete block comprising a first wedge made of saturable absorber material and a second wedge made of a nonsaturable absorber material, and wherein the first wedge and the second wedge are sized and assembled to form a substantially constant optical thickness block; and
    wherein the block and the another block are juxtaposed and oriented such that the total thickness of saturable absorber material along the laser axis constant.

9. A Q-switched laser system comprising:
    a laser cavity with a gain medium and having a laser cavity axis;
    a passive Q-switch element situated within the laser cavity, for varying a Pulse Repetition Frequency of the laser;
    means for translating the Q-switch element in a direction not parallel to the laser axis;
    wherein the Q-switch element comprises a first wedge made of saturable absorber material and a second wedge made of a non-saturable absorber material, and wherein the first wedge and the second wedge are sized and assembled to form a discrete, substantially constant optical thickness block;
    a photo-detector to detect the occurrence of laser pulses;

a servo control system to compare the pulse repetition frequency of said laser pulses with a predetermined set value; and an actuator attached to said Q-switch element for moving said Q-switch element in a direction that alters the pulse repetition frequency of the laser to the predetermined set value.

10. The variable Q-switched laser of claim 9 wherein the Q-switch element is situated at an angle to said laser cavity.

11. The variable Q-switch laser of claim 9 wherein the angle equals the Brewster angle of the Q-switch materials.

12. The variable Q-switched laser system of claim 9 wherein:

the Q-switch element further comprises another discrete block comprising a first wedge made of saturable absorber material and a second wedge made of a non-saturable absorber material, and wherein the first wedge and the second wedge are sized and assembled to form a substantially constant optical thickness block; and wherein the block and the another block are juxtaposed and oriented such that the total optical thickness of saturable absorber material along the laser axis is constant.

13. A method for controlling a pulse repetition frequency (PRF) of a passively Q-switched laser comprising the steps of:

Q-switching said laser with a Q-switch element including a saturable absorber material of varying optical thickness detecting the pulse repetition frequency of said laser;

comparing said pulse repetition frequency with a preset value; and translating the Q-switch element such that the optical thickness of saturable absorber material along the laser axis is altered, wherein a PRF of the laser changes to correspond to said preset value.

* * * * *

UNITED STATES PATENT AND TRADEMARK OFFICE
CERTIFICATE OF CORRECTION

PATENT NO. : 7,319,708 B2 Page 1 of 1
APPLICATION NO. : 11/062992
DATED : January 15, 2008
INVENTOR(S) : Koroshetz et al.

It is certified that error appears in the above-identified patent and that said Letters Patent is hereby corrected as shown below:

In column 2, line 59, add --include-- after "also".

Signed and Sealed this

Twentieth Day of October, 2009

David J. Kappos
*Director of the United States Patent and Trademark Office*